No. 716,808. Patented Dec. 23, 1902.
C. N. CHOATE.
WEEDING AND CULTIVATING IMPLEMENT.
(Application filed Feb. 25, 1902.)
(No Model.)
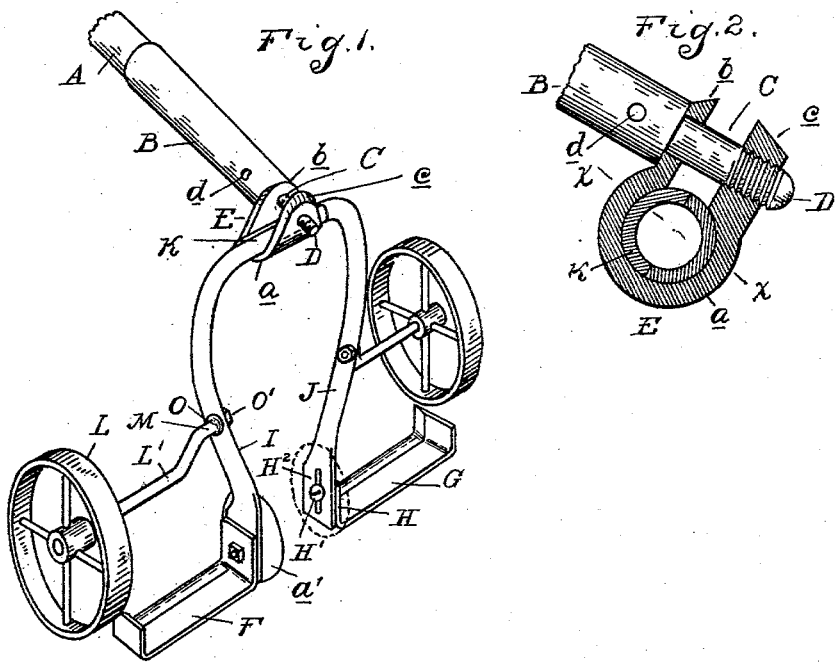
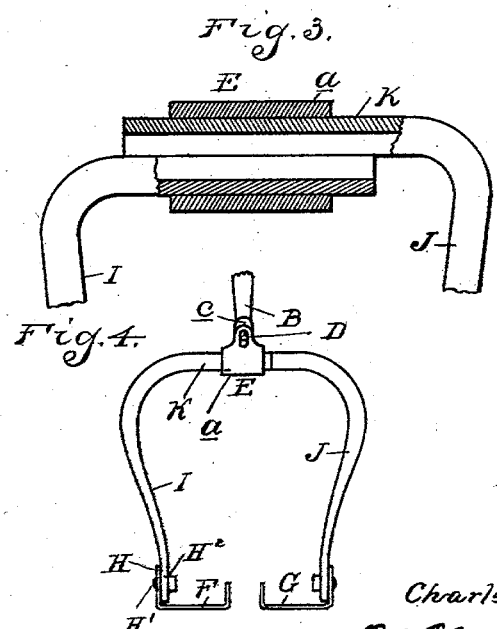
Witnesses
Inventor
Charles N. Choate
By attys.

UNITED STATES PATENT OFFICE.

CHARLES N. CHOATE, OF DETROIT, MICHIGAN, ASSIGNOR OF ONE-THIRD TO WILLIAM R. ANDERSON, OF DETROIT, MICHIGAN.

WEEDING AND CULTIVATING IMPLEMENT.

SPECIFICATION forming part of Letters Patent No. 716,808, dated December 23, 1902.

Application filed February 25, 1902. Serial No. 95,565. (No model.)

*To all whom it may concern:*

Be it known that I, CHARLES N. CHOATE, a citizen of the United States, residing at Detroit, in the county of Wayne and State of Michigan, have invented certain new and useful Improvements in Weeding and Cultivating Implements, of which the following is a specification, reference being had therein to the accompanying drawings.

The invention has reference particularly to a novel type of hoe especially designed for weeding, blocking out, and cultivating beets, onions, cotton, &c.; and the invention consists in the peculiar construction of the implement and in the novel arrangement and combination of its various parts, as more fully hereinafter described, and illustrated in the drawings, in which—

Figure 1 is a perspective view of the weeding and cultivating implement. Fig. 2 is a cross-section through the clamping-head. Fig. 3 is a section taken on line $x\ x$, Fig. 2; and Fig. 4 is a view in front elevation of the implement, the blades being shown in different relation to each other.

In the drawings thus briefly described the reference-letter A designates a suitable operating-handle, one end of which is fitted within a socket member B, as plainly shown in Fig. 1. At its free end the socket carries a reduced portion C, threaded at its end, as shown at D, and E is a clamping-head in the form of a clip, which is mounted upon the extension or reduced portion C. The head, as shown, comprises a body $a$ with complementary arm members $b$ and $c$, each being apertured to permit of the insertion therethrough of the portion C of the socket. The outer arm member of the clip has the walls of the aperture threaded, as shown, to engage the thread D. By this method of construction the clamping of the head may be effected by a rotary movement of the operating-handle.

F and G designate two spaced laterally-extending blades, and I and J are shanks for these blades, which connect the latter with the head. In construction these shanks are curved outwardly, as plainly shown in Fig. 1, to allow of the ready passage of the plants therebetween and are bent at their upper ends to form transversely-extending portions K. These transverse portions, as shown in Fig. 3, are adapted to engage within the head and are clamped in place by means of the rotary movement of the handle before described.

In use the implement is adapted to straddle a row of plants, so that one cutter-blade will operate on each side of a row, and thus the cultivating and weeding may be rapidly and easily effected. By adjustably securing the blade-shanks within the clamping head or holder it will be obvious that the blades are susceptible of lateral adjustment, so that the implement may be readily accommodated to the size of the plants in the row. Furthermore, the adjusting mechanism is such that the blades are moved laterally in the same plane, the result being that in cultivating the earth is left in the same place properly pulverized and level.

By means of the rotary adjustment of the shanks in the holder the angle of inclination between the shanks and handle may be changed as desired, and thus the implement be so adjusted as to be used by persons of different heights.

I may and preferably do connect the blades to the shanks in such manner that they may be adjusted vertically, if desired. The adjusting means preferably consists of a flanged portion H on the inner end of each blade and a bolt H′, extending through the flanged portion and a slot H² in the shank.

It has also been found convenient during the operation of cultivating to break or cut the soil for the blades, so that the latter when being moved forward or backward will not drag the earth. For this purpose I preferably employ cutter-disks $a'$ and mount these disks upon the bolts H′, which connect the blades to the shanks, as plainly shown in Fig. 1.

The implement is further provided with wheels or rollers L, whereby it is capable of being wheeled over the ground during the operation of weeding and cultivating. As shown in the drawings, the rollers are carried upon transverse axles L′, which in turn are connected to the shanks J and I by cranks M. The crank ends extend through the shanks at a distance above and preferably immediately over the blades and are clamped in position by any suitable appliances, such as a shoulder O and a nut O'. By this construction when it is desired to regulate the depth of cut of the blades this may be effected by a rotary adjustment of the cranks.

In Fig. 4 the blades are shown in a different position than illustrated in the other figures. Here the blades are extended inwardly, but are capable of the same lateral and rotary adjustment as before described.

An aperture $d$ is shown in the drawings as formed within the socket in proximity to the clamping-head. A pin or suitable implement may be inserted, if desired, within this aperture, and through the leverage obtained by the pin the handle may be rotated for the purpose of tightly clamping the head.

What I claim as my invention is—

1. In a weeding and cultivating implement, the combination with an operating-handle, of two spaced laterally-extending blades carried thereby, and means for adjusting the blades laterally in a common horizontal plane independently of the handle.

2. In a weeding and cultivating implement, the combination with an operating-handle, of a clamping-head carried thereby, spaced laterally-extending blades, and shanks for the blades mounted within the head for lateral adjustment.

3. In a weeding and cultivating implement, the combination with an operating-handle, of a clamping-head carried thereby, spaced laterally-extending blades, and shanks for the blades mounted within the head for rotary adjustment.

4. In a weeding and cultivating implement, the combination with an operating-handle, of two spaced blades projecting laterally from opposite sides of the handle, a shank for each blade carrying at its upper end a transverse member, and a head upon the handle in which the transverse members of the shanks are adjustably secured.

5. In a weeding and cultivating implement, the combination of two spaced laterally-extending blades, shanks therefor, a clamping-head in which the free ends of the shanks engage, an operating-handle, and connections between said handle and head whereby upon the rotation of the former the clamping of the head may be effected.

6. The combination of two spaced laterally-extending blades, shanks therefor having inwardly-projecting transverse portions at their upper ends, a clip embracing said transverse portions of the shanks, a socket having a reduced and threaded end extending through one member of the clip and having a threaded engagement with the other, and an operating-handle fitted within the socket.

7. In a weeding and cultivating implement, the combination with a single operating-handle, of spaced horizontal blades arranged in axial alinement below the handle, vertically-extending shanks connecting the blades with the handle, wheeled axles carried by the shanks, and means for rocking the axles upon the shanks to vary the depth of cut of the blades.

8. In a weeding and cultivating implement, the combination with the wheeled axles, spaced laterally-extending blades directly below the axles, and an operating-handle for the blades.

9. In a weeding and cultivating implement, the combination with an operating-handle, of spaced laterally-extending blades below said handle, and vertically-extending shanks connecting the blades with the handle, the shanks being bowed or curved outwardly forming an enlarged opening therebetween and above the blades through which the tops of the plants that are being cultivated may freely pass.

10. In a weeding and cultivating implement, the combination with an operating-handle, shanks connected thereto, spaced laterally-extending blades secured to the shank ends, and cutter-disks carried by said shanks adjacent to the blades.

In testimony whereof I affix my signature in presence of two witnesses.

CHARLES N. CHOATE.

Witnesses:
H. C. SMITH,
M. B. O'DOGHERTY.